United States Patent [19]

Donald

[11] Patent Number: 4,821,488

[45] Date of Patent: Apr. 18, 1989

[54] ASEPTIC PACKAGING

[76] Inventor: Robert A. Donald, 328 Hammond Road, Landenong, Victoria 3175, Australia

[21] Appl. No.: 914,067

[22] Filed: Oct. 1, 1986

[30] Foreign Application Priority Data

Oct. 2, 1985 [AU] Australia .................. PH2718/85

[51] Int. Cl.⁴ .................. B65B 9/08; B65B 51/02; B65B 51/05; B65B 51.08
[52] U.S. Cl. .................. 53/417; 53/450; 53/451
[58] Field of Search .................. 53/451, 450, 477, 483, 53/551, 138 R, 138 A, 417, 419; 156/203, 466

[56] References Cited

U.S. PATENT DOCUMENTS

| 1,044,948 | 11/1912 | Ulmer | 53/483 X |
|---|---|---|---|
| 1,208,828 | 12/1916 | Planco | 53/483 X |
| 3,318,977 | 5/1967 | Battersby et al. | 156/203 X |
| 3,426,499 | 2/1969 | Paige | 53/451 |
| 3,478,870 | 11/1969 | Segel | 53/451 X |
| 3,528,876 | 9/1970 | Bouhaben et al. | 156/203 X |
| 3,703,796 | 11/1972 | Inoue et al. | 53/551 X |
| 3,780,488 | 12/1973 | Herrell | 53/451 X |
| 3,935,048 | 1/1976 | Rucker | 53/451 X |
| 4,208,855 | 6/1980 | Schirmer | 53/483 X |
| 4,557,888 | 12/1985 | Rausing et al. | 156/203 X |

Primary Examiner—Horace M. Culver
Attorney, Agent, or Firm—Larson and Taylor

[57] ABSTRACT

Components for aseptic packaging, a method of forming such a package and an aseptically filled package using a construction of flexible plastics material sandwiching a material which is impervious to micro-organisms, the longitudinal seal being made between two surfaces of the same material. The specification also discloses a form of end closure including a plug of resilient material which ensure the integrity of the closure.

1 Claim, 1 Drawing Sheet

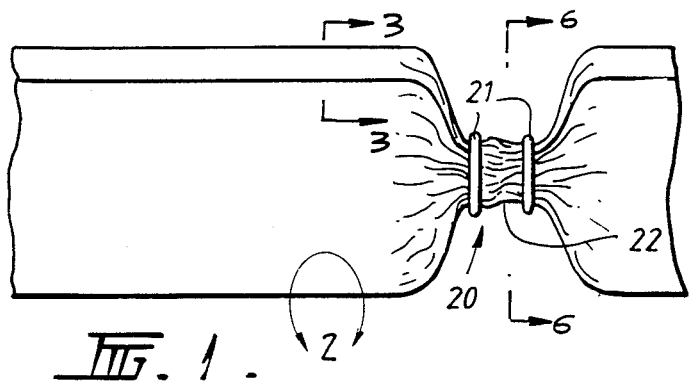
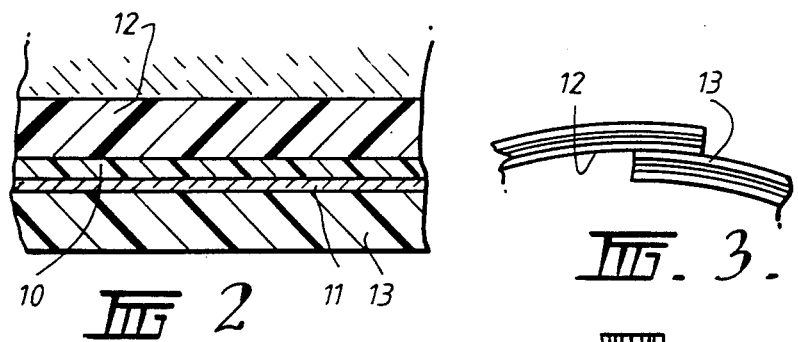
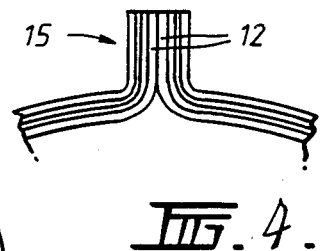
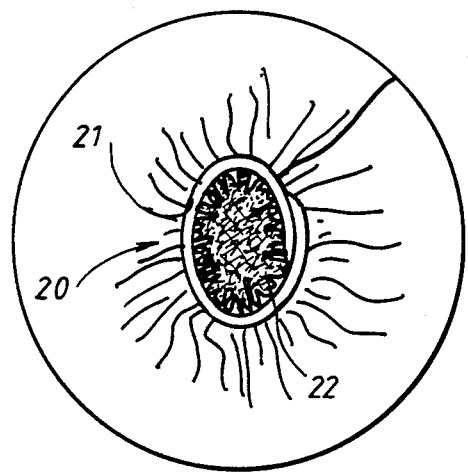

ASEPTIC PACKAGING

This invention relates to improved aseptic packaging and aseptically packed products and, in particular, to improved aseptic packaging of products which are packed in films in the form of sausages but it can also relate to products packed in film packages of any other configuration.

In present aseptic packaging methods there are three areas in which the integrity of the package can break down.

In the first of these, if the film or foil, hereinafter called film, is not impervious to the transmission of micro-organisms, oxygen, other gases or water vapour, then there can be degradation of the product by transmission through the film. For ease in this specification we will refer generally to micro-organisms and such reference is considered to relate to other things which can pass through the film and which can degrade the product.

In practice, this has normally been overcome, and generally quite satisfactorily, by using a composite film which may preferably have two parent components of a polyester, which may satisfactorily be polypropylene, which are adhesively secured. Generally each of the parent materials has a very thin layer of an impervious material coated thereon, and in many cases this material may be polyvinylidene chloride, and at least one of the layers may also have a film of a metal, such as aluminium vacuum deposited thereon.

Such films do provide a good barrier to micro-organisms but, where they are to be connected, such as along a longitudinal seam, if a cylindrical package is being formed, or about the periphery of a differently shaped package, connection is normally by means of heat welding. The weld is made between two very thin layers of PVDC and this can cause the second area of difficulty which is encountered in that the PVDC layer can partially separate from its parent layer and the weld may thus not be microbiologically continuous.

Also, physically, it may be that the weld can break if the package is distorted as by being dropped.

Further, as PVDC is relatively non-elastic, if there is physical distortion of the package, as when a package is dropped, then the PVDC tends to split and the whole package can split and, not only is the integrity of the package destroyed, the contents may spill. Such packages are generally, not acceptable to distributors and retailers.

A further area where there have been difficulties with such packages, particularly when they are in the form of cylinders, has to do with the closing of the cylinders.

Normally during formation the filled cylinder, where it is to form the ends of adjacent packages, is compressed and a pair of metallic clips are passed around the compressed cylinder and are deformed to draw the package closed and, after the clips have been closed, the packages are severed between the clips.

Because the film is bunched beneath the clip it is possible that there can be a path through the seal to permit degradation of the contents of the package. Also, because the clips are simple crimped, it is possible that, on physical mishandling of the package, there can be deformation of the clip which can destroy the integrity of the package.

The invention has a combination of objects which are designed to overcome, or at least minimise, the disadvantages set out hereinbefore.

In a first aspect of the invention I provide a new form of film for aseptic packaging which film has outer layers of a flexible plastics material and, sandwiched between these, a material which is impervious to microorganisms.

Preferably the impervious layer comprises a layer of a polyester material and a layer of metal is located adjacent the polester layer.

The layer of metal, which is preferably aluminium, is preferably deposited on the layer of thermoplastics material but it may be desposited on one of the layers of a flexible plastics material before the layer of polyester material is jointed to the flexible plastics material, either during a coextrusion process or an adhesive securing process.

In a second aspect of the invention I provide an improved method of sealing in manufacturing packages from film wherein the layers in contact and between which the seal is made are of the same material.

Where a lap seal is used, the film has, on both surfaces, a layer of the same material.

I may also provide an improved method of sealing means in manufacturing packages from films which includes an adhesive seal which, together with a heat seal, provide a seal which is both mechanically strong as well as being impervious to micro-organisms.

In a still further aspect of the invention I provide an improved way of sealing the ends of a cylindrical package in which an adhesive is introduced into the area where the clip, which can be deformed to seal the end, is to be located, which adhesive provides a plug at the end of the closure which fills the interstices of the material forming the package.

In order that the various aspects of the invention may be more readily understood, I shall describe the invention as applied to a cylindrical package of a foodstuff, although it is to be understood that the invention is equally applicable to packages of other shapes.

The package is illustrated in the accompanying drawings, in which:

FIG. 1 is a longitudinal sectional view showing the arrangement of the foodstuff package;

FIG. 2 is an enlarged view at 2 of FIG. 1 showing the constituents of the film;

FIG. 3 is a partial view along line 3—3 of FIG. 1 showing a form of lap joint;

FIG. 4 is a Figure similar to FIG. 3 showing a fin joint before this is turned over against the package;

FIG. 5 is a view similar to that of FIG. 3 but showing the addition of an adhesive which aids the mechanical stability of the package; and FIG. 6 is an end view of the package showing the location of the adhesive plug the area where the package is sealed.

Referring initially to the formation of the film, this comprises a central polyester layer 10, a deposited metal film 11 and two outer layers 12, 13 of a flexible plastics material, preferably polyethylene.

Whilst the layers 10, 12 and 13 may not be completely impervious to the transmission of micro-organisms, oxygen, other gasses or water vapour, the imperviability is provided by the metal film 11.

Preferably this is a film of aluminium which is deposited on the central polyester film 10 prior to the location of the outer films 12, 13 thereover, the outer films being formed either by coextrusion or adhesive securing to the central film.

The deposited layer 11 can be very thin, whilst giving a complete coverage and complete imperviability, but, at the same time, is very flexible, as will be discussed hereinafter. Preferably the deposted layer can be printed to provide an attractive pack for the product.

The outer layers are preferably of linear low density polythene and these may have additives, known in the packaging art, for example to increase clarity and for other purposes.

The film of the invention is basically made of very thin layers and an exemplification could be that the central layer 10 of polyester may be 10 $\mu$m thick; the deposited film 11 may be of aluminum and may be of 1-2 $\mu$m thick; and the outer layers 12, 13 may of a linear low density polyethylene and may be 30 $\mu$m thick, giving a total thickness of the order of 72-75 $\mu$m when the securement of the layers is considered. We have found a film of this thickness gives a good package integrity, including a good feel.

This is distinguished from the films which are used in non-aseptic packaging processes, normally called retort packaging, in which the product is initially hermetically sealed within the package and then goes through a retorting process which cooks the product and, at the same time, destroys any micro-organisms which are within the package.

It will be appreciated that, physically, the packaging for such products must be strong, and any seals must be extensive, as there is a substantial increase in pressure within the package during the retorting process.

Also, very often, an aluminium foil is incorporated in the packaging material which adds to the expense and, as indicated herein, is unsatisfactory for an aseptic package where the ends of the package are drawn together and crimped, as the aluminium tends to pinhole or crack. If deposited aluminium is used, this can degrade at retorting temperatures.

Further, such films need to use adhesives which are stable at temperatures of the order of 120° C., whereas, using my process, stability to the order of 80° C. is all that is required.

With my package, on the other hand, the product, whilst it is fed to the package hot, has been sterilised during the cooking procedure and the filling process is aseptic so that there is no contamination introduced during this procedure and post filling treatment is not required.

It is for this reason that I can use films which are, over all, very much thinner, and thus cheaper, than the films used in retort packages.

The film of the present invention has substantial advantages over previous films, and particularly those which included layers of PVDC, which is a relatively non-elastic material.

The film of the present invention, as a whole, has a high degree of elasticity and, thus, it can accept substantial physical mishandling without damage.

By using the film of the invention, even a relatively heavy package will not be damaged by being dropped, for example, onto a floor from a substantial height. The package is sufficiently resilient to absorb such treatment without damage.

This is, of course, important from a sales point of view. The main competitive forms of packaging for the type of foodstuffs to which this invention relates are canned packages or retort packages.

Canning is basically expensive, because of the cost of the can and the cost in sealing the can and, for some products, is not completely satisfactory as the products are treated under high temperatures and pressures to destroy micro-organisms. On the other hand, physically, a can is a very satisfactory method of storing products as cans are strong, but cans can be badly distorted if dropped from a height and can be pierced on striking a sharp object, although this is unusual.

Retort packaging suffers from a disadvantage similar to cans in that the product is treated to high temperatures and pressures, often to its detriment, and, generally, retort packages tend to be damaged if, say, dropped onto a surface from a height.

Also, as discussed earlier, the films used for retort packaging are relatively expensive because they are thick.

The film of the invention thus has substantial advantages over both these previously used forms of packaging whilst having only minor disadvantages.

Referring now to FIGS. 3 and 5, I show means whereby the longitudinal seal of a package can be made.

FIG. 3 shows the most usual type of seal, a lap seal, and it will be seen that the outer layer 13 along one edge of the film is in contact with the inner layer 12 along the other edge of the film and it is these two layers which are connected together.

As previously explained, these layers are of a similar material, in the specific example, polyethylene, and it is thus possible to make a good and continuous seal between these layers thus preventing ingress of microorganisms or other deleterious gasses into contact with the food contained in the package.

Also, as each of these films can be strongly laminated to the central layer 10, there is no likelihood of delamination when the seal is made and thus a good and coherent package is formed.

The example of FIG. 4 is somewhat different as, in this case, the abutting surfaces, which form a fin 15, are both the inner layer 12. This, of course, ensures, once again, a good seal being achieved but this arrangement can be used where the inner and outer layers are of different material.

In the form of arrangement shown in FIG. 4, there would normally be another step in the formation of the cylindrical package, that is by turning the fin 15 to one side and then securing it to the surface of the package.

FIG. 5, as explained, is a view similar to that of FIG. 3 but, in this case, I also provide an adhesive material 16 at the edge of the lap joint, which material can assist in aiding the mechanical integrity of the seal as well as adding an additional barrier to the passage of microorganisms.

A third aspect of my invention is basically directed to the end seals 20 of cylindrical packages and will be described as so directed but it will be understood that it an be applied to different forms of packages.

In the manufacture of a product which is aseptically packaged in film, the film, either in the form of a cylinder or in the form of a sheet which is formed into a cylinder, is filled continuously with a material and where the individual packages are to be formed, means are provided to compress the cylinder thus, basically, removing the material being packaged from the area and when compression is completed, deformable clips 21 are placed about the package at two spaced positions, which clips effect the sealing of the ends of the packages and, after location, the material 22 between the clips is severed.

Conventionally, the clips 21 used were of aluminum, as being a metal which is relatively easy to deform, but I prefer to use steel clips which, although more difficult to deform, once they are deformed, tend to retain their deformed condition and are unlikely to be displaced.

In the sealing of the ends, it will be appreciated that the film is bunched whilst the foodstuff in the package is displaced and, provided the final compression is sufficient, there should be no voids through the seal.

However, because of this bunching, there is always a possibility that a passage sufficient for the passage of micro-organisms can be left in the sealed end.

In order to overcome this, I prefer to locate, at the position at which the seal is to be maintained, an adhesive material, which may be a microcrystalline wax or some form of silicone adhesive, which material, on compression, flows to fill any interstices which are left in the package and to, thus, increase the integrity of the seal.

The wax or adhesive should have properties of a good tack, to adhere to the film, be solvent free, plastic at the clipping stage, be compatible with food and be of relatively low cost. Two suitable materials are those sold under the trade marks "Ultraflex Amber" and "Microflex".

This adhesive may be applied to the film as it is passing along its path to the position where it is formed into the package and, preferably, the adhesive sets so that it retains its position on the film during movement.

When the actual closing step takes place, as the clip is tightened, the adhesive is caused to flow into any interstices in the film and fill these. It may be preferred that the adhesive softens or melts, at least to a certain degree, when heated by the product which is in contact with the adhesive, to aid this flow.

When the product cools, the adhesive sets to form a plug which provides a barrier to the passage of micro-organisms.

The adhesive is selected so that it is inert to foodstuffs and does not attract foodstuff to its surface, although this is not critical as the package is normally opened by removing the end inside the clip and the adhesive would normally be discarded with the end of the package and the clip.

It will be seen that the adhesive not only provides a physical barrier for micro-organisms and other deleterious substances, but, also, can set to physically strengthen the package at its ends.

It will be seen that the use of the various aspects of the invention in aseptic packaging does provide a package which is more successful than previously proposed packages and, at the same time, provides a package which can permit satisfactory packaging of products at a price which can be substantially less than competitive packages.

It will be appreciated that the different aspects described herein do not have to all be used in a particular packaging arrangement, they can be selectively used as required.

I claim:

1. A method of continuously forming and filling aseptic packages from a film which has outer layers of a flexible plastic material having sandwiched therebetween a material that is impervious to microorganisms, said method comprising forming a continuous substantially cylindrical package from the film with adjacent edges thereof being in contact to form a cylinder, heat sealing said adjacent edges of the film with the plastic materials of the adjacent edges which are sealed together being the same, filling the cylinder, after formation thereof and heat sealing of the adjacent edges thereof, to form a filled cylinder, locating an adhesive in the cylinder at positions where the cylinder is to be divided into individual packages, compressing the filled cylinder at the positions of the adhesive, placing two clips about the positions of the adhesive after compression thereof and tightening the clips such that as the clips are tightened the adhesive flows to occupy any interstices in the film which are formed during the compression to thereby provide a plug between the clips, and separating the cylinder between the clips into individual packages.

* * * * *